(12) United States Patent
Pattichis et al.

(10) Patent No.: US 9,542,198 B2
(45) Date of Patent: *Jan. 10, 2017

(54) SYSTEM AND METHODS FOR DYNAMIC MANAGEMENT OF HARDWARE RESOURCES

(71) Applicant: STC.UNM, Albuquerque, NM (US)

(72) Inventors: Marios Stephanou Pattichis, Albuquerque, NM (US); Yuebing Jiang, Albuquerque, NM (US); Daniel Rolando Llamocca Obregon, Albuquerque, NM (US)

(73) Assignee: STC. UNM, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,627

(22) Filed: Jul. 6, 2015

(65) Prior Publication Data
US 2015/0309802 A1 Oct. 29, 2015

Related U.S. Application Data

(63) Continuation of application No. 14/069,822, filed on Nov. 1, 2013, now Pat. No. 9,111,059.

(60) Provisional application No. 61/721,246, filed on Nov. 1, 2012.

(51) Int. Cl.
*G06F 9/455* (2006.01)
*G06F 17/50* (2006.01)
*G06F 9/44* (2006.01)
*H03H 17/06* (2006.01)
(Continued)

(52) U.S. Cl.
CPC ......... *G06F 9/4401* (2013.01); *G06F 17/5054* (2013.01); *H03H 17/0294* (2013.01); *H03H 17/06* (2013.01); *H04N 19/625* (2014.11); *G06F 2217/08* (2013.01); *H03H 17/0241* (2013.01)

(58) Field of Classification Search
CPC G06F 9/4401; G06F 17/5054; G06F 2217/08; H04N 19/625; H03H 17/0294; H03H 17/06; H03H 17/0241
See application file for complete search history.

(56) References Cited

U.S. PATENT DOCUMENTS

| 7,305,649 | B2 | 12/2007 | Bellas et al. | |
|---|---|---|---|---|
| 7,678,048 | B1 * | 3/2010 | Urbano | A61B 8/00 367/103 |
| 7,743,296 | B1 | 6/2010 | Pierce et al. | |

(Continued)

OTHER PUBLICATIONS

"Multiobjective Optimization of FPGA-Based Medical Image Registration", Omkar Dandekar, William Plishker, and Raj Shekhar, @2008 IEEE.*

(Continued)

*Primary Examiner* — Nha Nguyen
(74) *Attorney, Agent, or Firm* — Valauskas Corder LLC

(57) ABSTRACT

A dynamically reconfigurable framework manages processing applications in order to meet time-varying constraints to select an optimal hardware architecture. The optimal architecture satisfies time-varying constraints including for example, supplied power, required performance, accuracy levels, available bandwidth, and quality of output such as image reconstruction. The process of determining an optimal solution is defined in terms of multi-objective optimization using Pareto-optimal realizations.

19 Claims, 14 Drawing Sheets

(51) Int. Cl.
*H04N 19/625* (2014.01)
*H03H 17/02* (2006.01)

(56) References Cited

U.S. PATENT DOCUMENTS

| | | | |
|---|---|---|---|
| 8,397,204 | B2 | 3/2013 | Sengupta et al. |
| 8,443,329 | B2 | 5/2013 | McConaghy |
| 2007/0300238 | A1* | 12/2007 | Kontothanassis ......... G06F 8/70 719/320 |
| 2008/0215854 | A1 | 9/2008 | Asaad et al. |
| 2009/0063599 | A1 | 3/2009 | Reznik |
| 2009/0244395 | A1* | 10/2009 | Druck ................... G06F 17/153 348/720 |
| 2013/0017850 | A1* | 1/2013 | Abdelmonem ...... H04B 1/1036 455/501 |
| 2013/0021058 | A1 | 1/2013 | Huang et al. |
| 2013/0099821 | A1 | 4/2013 | Huang et al. |
| 2013/0104093 | A1 | 4/2013 | Huang et al. |
| 2013/0263072 | A1 | 10/2013 | Reddy et al. |
| 2014/0089699 | A1 | 3/2014 | O'Connor et al. |
| 2014/0206351 | A1 | 7/2014 | Abdelmonem et al. |

OTHER PUBLICATIONS

Dandekar, Omkar et al., Multiobjective Optimization of FPGA-Based Medical Image Registration, IEEE Computer Society, 2008,183-192.

* cited by examiner

SYSTEM AND METHODS FOR DYNAMIC MANAGEMENT OF HARDWARE RESOURCES

CROSS-REFERENCE TO RELATED APPLICATIONS

This application is a continuation of co-pending U.S. patent application Ser. No. 14/069,822 filed Nov. 1, 2013, which claims the benefit of U.S. Provisional Patent Application No. 61/721,246 filed Nov. 1, 2012, hereby incorporated by reference.

FIELD OF THE INVENTION

The invention relates generally to computer hardware architecture. More specifically, the invention relates to integrated circuits and dynamic management of hardware resources in an embedded system.

BACKGROUND OF THE INVENTION

While a computer system is operating, resources are spent to'manage various aspects of the system. Systems may be configured before operation to prioritize certain resources of the system over others. Other systems may include an embedded system that configures system resources. Embedded systems typically maintain a dedicated function within a larger mechanical, electrical or computer system, often with real-time computing constraints.

Embedded systems include, for example, hardware components such as programmable logic devices (PLDs). PLDs, including field-programmable gate arrays (FPGAs), are integrated circuits (ICs) that can be programmed to implement user-defined logic functions.

FPGAs are an important and commonly used circuit element in conventional electronic systems. FPGAs are attractive for use in many designs in view of their low non-recurring engineering costs and rapid time to market. FPGA circuitry is also being increasingly integrated within other circuitry to provide a desired amount of programmable logic. Many applications can be implemented using FPGA devices without the need of fabricating a custom integrated circuit.

Scalable solutions for embedded systems are desired that can deliver different solutions based on one or more constraints. As an example, it is desirable to have a low-energy solution when there is a requirement for long-time operation and a high-performance solution when there is no power (or energy) constraint. More specifically, scalable solutions are desired that can allocate hardware resources based on constraints, for example minimize energy consumption, minimize bitrate requirements, increase accuracy, increase performance, and/or improve image quality.

The invention satisfies the demand for a dynamically reconfigurable framework and methods that provide optimal scalable solutions that can meet real-time constraints.

SUMMARY OF THE INVENTION

Dynamically reconfigurable frameworks offer unique advantages over non-dynamic systems. Dynamic adaptation provides the ability to adapt hardware resources to match real-time varying requirements.

Embodiments of the invention include a system and methods for improving resource management in embedded computer systems. The managed resources (or objectives) may be directed to constraints. The term constraint is also referred to as real-time constraint or time-varying constraint. Time-varying constraints include, for example, constraints on the supplied power, required performance, accuracy levels, available bandwidth, and quality of output such as image reconstruction. It is contemplated that constraints can be generated by a user, by the system, or by data inputs.

During operation of a computer system, various states may exist in which one or more of the constraints is more important than the other. However, while allocating more resources to, for example, performance, the system strives to maintain optimal energy, power, and accuracy at the highest level without taking away from performance resources. As an example, digital video processing requires significant hardware resources to achieve acceptable performance.

According to one embodiment of the invention, an efficient architecture is parameterized. Hardware/software parameters are identified for performing a task with time-varying constraints. Different hardware realizations and hardware/software parameters are generated to realize different implementations of the system. A training set of data such as images are used to generate the target objective space. Alternatively, instead of using a training set, the system may reconstruct the target objective space from system measurements taken during operations, and then apply regression to predict how the target objective space can change with small hardware/software parameter changes.

Examples of objective space include, for example, the energy/power, performance, accuracy (EPA objective space) or dynamic power/energy, bandwidth, and image reconstruction quality (DPBQ objective space). The Pareto-optimal realizations for the space are determined.

The concept of Pareto-optimal realization is based on the premise that no one objective can be made better off without making at least one other objective worse off. A Pareto-front refers to the collection of solutions that cannot be improved upon. Here, an improvement would be the existence of a solution that gives equal or better performance in all objectives, while providing better performance in at-least one of the objectives.

Clearly, a desired allocation of resources changes over time. Advantageously, embodiments of the invention permit real-time management of resources. For example, for a mobile computer system, e.g., a smartphone or a tablet device that is running out of battery, it is important to switch to a low-power mode. On the other hand, when there is a heightened interest in specific sections of a video sequence, achieving performance and accuracy are more important, potentially, at the expense of power consumption.

According to another embodiment of the invention, fully-parameterized hardware cores are developed for applications such as signal, image, and video processing applications that may include processing of an image, a video, a digital signal, a small or large dataset, or any combination thereof. A hardware controller may be used to implement a hardware core. The architectures are implemented with techniques that minimize the amount of computing resources and take advantage of dynamic partial reconfiguration.

Two technologies currently available on Field Programmable Gate Arrays (FPGAs) enable a dynamically reconfigurable management framework that can meet constraints.

The first technology—dynamic partial reconfiguration (DPR)—can effectively handle the run-time allocation and de-allocation of hardware resources by modifying or switching off portions of the FPGA while the rest remains intact, continuing its operation. DPR is a method for reconstruction of programmable logic circuits, while the rest of the logic is not interrupted and continues working.

The operating FPGA design may be modified, for example, by loading a partial configuration file, usually a partial bit file. After a full bit file configures the FPGA (full reconfiguration), partial bit files can be downloaded to modify reconfigurable regions in the FPGA without compromising the integrity of the applications running on those parts of the device that are not being reconfiguration. In addition to potentially reducing size, weight, power, and cost, dynamic partial reconfiguration enables new types of FPGA designs that provide efficiencies not attainable with conventional design techniques.

The second technology—dynamic frequency control (DFC)—can effectively allow for real time modification of the operating frequency of the digital clock managers (DCMs).

The invention introduces new real-time optimization approaches that can be used to achieve certain objectives— minimize dynamic power, maximize image quality, reduce bitrate, or provide balanced solutions for meeting real-time video constraints. Specifically, the invention extends traditional rate-distortion optimization approaches that do not consider dynamic energy or power constraints or the use of modern image quality metrics.

The dynamically reconfigurable framework according to the invention is demonstrated on: (1) a dynamic pixel processor, (2) a dynamically reconfigurable 1D digital filtering architecture, (3) a dynamically reconfigurable 2D separable digital filtering system and filterbank, and (4) a dynamically reconfigurable involving the discrete cosine transform (DCT).

Efficient implementations of the pixel processor are based on the use of look-up tables and local-multiplexes to minimize FPGA resources. For the pixel-processor, different realizations are generated based on the number of input bits, the number of cores, the number of output bits, and the frequency of operation. For each parameters combination, there is a different pixel-processor realization. Pareto-optimal realizations are selected based on measurements of energy per frame, peak signal-to-noise ratio (PSNR) accuracy, and performance in terms of frames per second. Dynamic reconfiguration management is demonstrated for a sequential list of real-time constraints by selecting optimal realizations and implementing using DPR and dynamic frequency control.

Efficient FPGA implementations for the 1D and 2D FIR filters are based on the use a distributed arithmetic technique. Different realizations are generated by varying the number of coefficients, coefficient bit-width, and output bit-width. Pareto-optimal realizations are selected in the EPA space and dynamic EPA management is demonstrated on the application of real-time EPA constraints on a digital video.

According to the invention, the dynamically reconfigurable framework can be applied to a variety of digital signal, image, and video processing systems. It is based on the use of offline-processing that is used to determine the Pareto-optimal realizations. Real-time constraints are met by selecting Pareto-optimal realizations pre-loaded in memory that are then implemented efficiently using DPR and/or dynamic frequency control.

It is contemplated that the invention may also provide the automatic generation of time-varying constraints. For example, the detection of a scene change may trigger a requirement for an increase in accuracy. Similarly, when a scene remains the same over a long period of time, a requirement for a decrease in power/energy consumption may be triggered. Ultimately, this framework is applicable to exciting new methods that allow for systems to only switch between architectures that are optimal in the multi-objective sense.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention.

DETAILED DESCRIPTION OF THE INVENTION

The invention is directed to a system and methods for dynamic reconfiguration of hardware resources and software parameters for various applications such as digital signal, image, and video. For applications such as digital signal, image, and video, constraints may include, for example, dynamic power/energy consumption, performance, accuracy, bitrate, and quality of output or image reconstruction quality.

Figure 1:
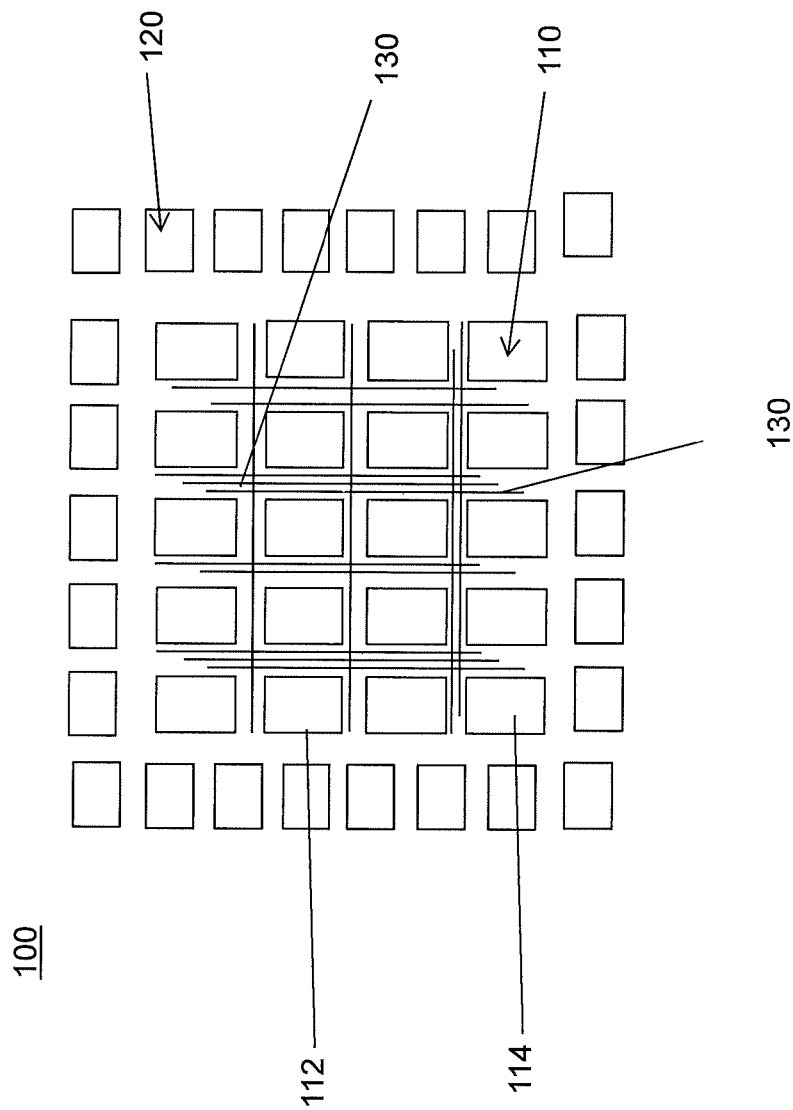
FIG. 1 illustrates the architecture of a field-programmable gate array (FPGA).

Programmable logic devices (PLDs), including field-programmable gate arrays (FPGAs), are integrated circuits (ICs) that can be programmed to implement user-defined logic functions. FIG. 1 is a simplified schematic view of a conventional FPGA. As shown in FIG. 1, a typical FPGA architecture 100 includes a programmable structure 110 made of an array of configurable logic blocks (CLBs) 112 including digital clock manager (DCM) logic blocks 114. The FPGA architecture 100 also includes a programmable interconnect structure 130. The programmable structure 110 and interconnect structure 130 are surrounded by a ring of programmable input/output (I/O) circuit blocks 120. Signals external to FPGA 100 can only communicate with the programmable structure 110 via this perimeter I/O circuit blocks 120. All three basic components of an FPGA—logic blocks, I/O blocks, and interconnect structure—can be re-programmed by the user.

CLBs implement the logic functions desired by a user or programmer and most CLBs accomplish this with one or more lookup tables (LUTs). LUTs are digital memory arrays that contain truth tables for any logic function that can be implemented by the given number of logic inputs for a CLB. The output of the CLB is then the logical result of the function recorded in the LUTs.

Given the significant processing requirements associated with real-time video processing, applications associated with digital video are considered, for example, single-pixel operations. Single-pixel operations include the implementation of functions that perform gamma correction, contrast enhancement, histogram equalization, histogram shaping, thresholding, Huffman table encoding, and quantization. After computing an appropriate function, each output pixel only depends on the corresponding input pixel.

In one embodiment, the invention is directed to a dynamically reconfiguration framework for implementing single-pixel operations. The system relies on a multi-objective optimization scheme that generates Pareto-optimal implementations in the power-performance-accuracy (PPA) space or the energy-performance-accuracy (EPA) space or the dynamic power/energy, bandwidth, and image reconstruction quality (DPBQ) space.

To compare among different single-pixel realizations, power requirements are considered, performance in terms of frame rates, and accuracy (PPA). According to the invention, the pixel processor selects an optimal architecture that satisfies time-varying PPA constraints. Thus, the process of determining an optimal solution is defined in terms of multi-objective optimization, with the goal of reducing power consumption, while maximizing performance and accuracy, subject to time-varying PPA constraints.

Current approaches of image processing systems based on dynamic partial reconfiguration (DPR) do not address issues associated with run-time modifications of the input/output bit-widths or the frequency of operation. However, using a multi-objective optimization approach to explore the Power-Performance-Accuracy space allows for both joint and separable optimization based on a range of criteria and constraints.

In the area of single-pixel operations for image enhancement, the invention utilizes lookup table (LUT)-based hardware to develop a fully-parameterized architecture that makes use of DPR and dynamic frequency control to control the PPA space. In addition, the multi-objective optimization framework is used to derive a set of optimal pixel processor realizations over which dynamic reconfiguration can be performed to meet PPA constraints.

The process of controlling PPA at run-time is referred to as dynamic power-performance-accuracy (DPPA) management. To achieve DPPA management, a space of different realizations is generated referred to as the PPA space. Then, optimal realizations are determined in the multi-objective sense. In other words, the Pareto optimal front of all realizations is determined. To generate the PPA space, a parameterized architecture is produced based on the input bit-width, output bit-width, the number of cores, and the frequency of operation.

Advantageously, the invention provides an optimization framework for dynamic PPA management of the pixel processor, the development of a fully-customizable core, and a method to dynamically reconfigure via DPR and run-time reconfiguration of the operating frequency.

According to the invention, the DPPA management system is based on a bottom-up approach. First, an efficient architecture for implementing single-pixel operations is developed. Then, the hardware description is parameterized and the parameters to generate the PPA space are varied. Third, a multi-objective optimization is used to determine the Pareto-optimal realizations. The Pareto-optimal realizations are then stored in memory. DPPA management selects among Pareto-optimal realizations to meet time-varying constraints.

Figure 2:
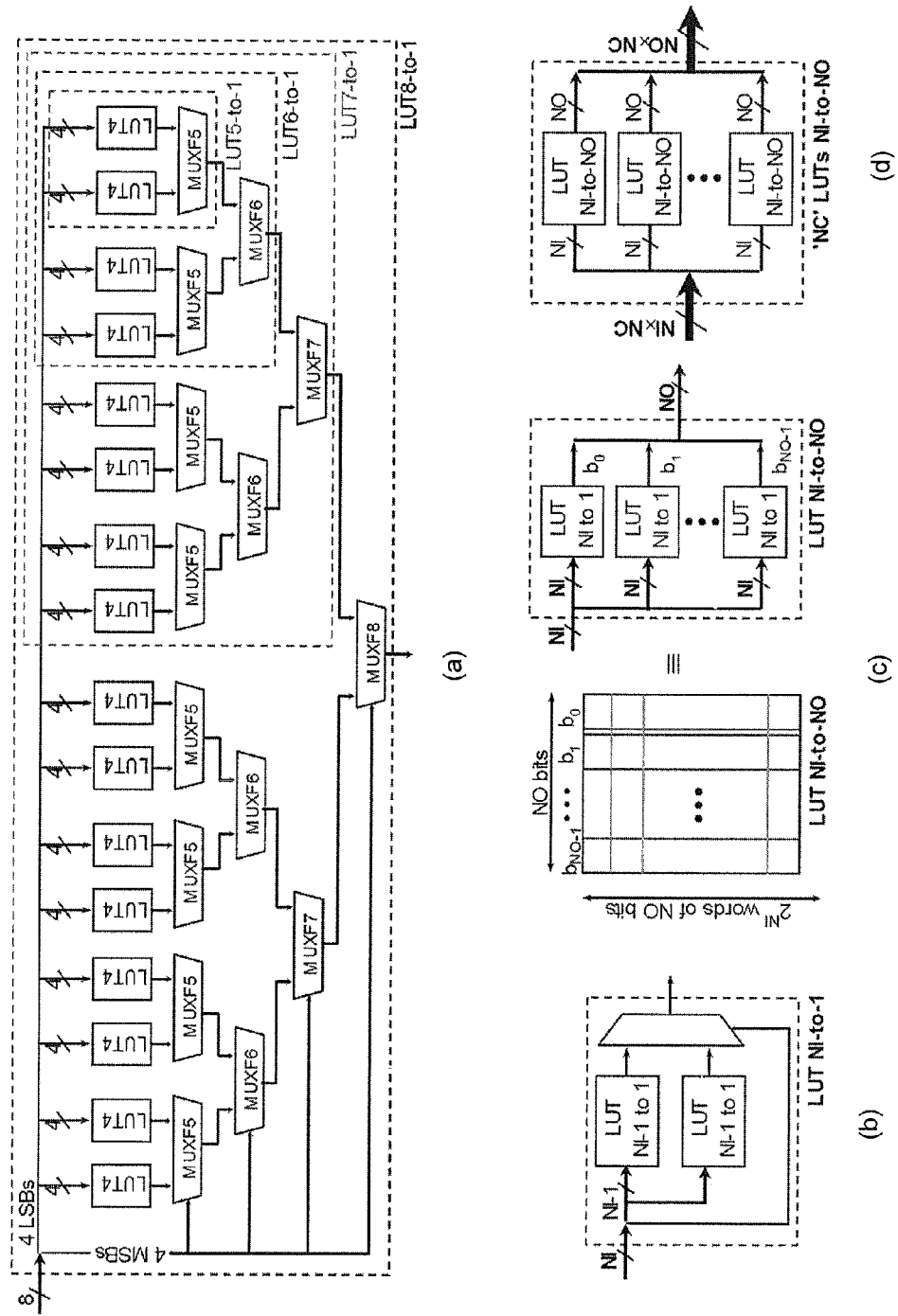
FIG. 2 illustrates one embodiment of a pixel processor architecture according to one embodiment of the invention.

FIG. 2 illustrates a fully-parameterized hardware architecture based on efficient mapping of LUTs. The pixel processor has the following parameters: (1) number of single-pixel processor cores (NC), number of input bits of each single-pixel processor or the number of bits of the input pixel (NI), number of output bits of each single-pixel processor or the number of bits of the output pixel (NO), and values specifying a unique single-pixel function such as gamma correction or contrast stretching (LUT contents).

A LUT is implemented with number of input bits of each single-pixel processor to number of output bits of each single-pixel processor (NI-to-NO). As shown specifically in FIG. 2(a), the LUT is implemented with 8-to-1—a recursive implementation with specific CLB primitives (LUT4, MUXF5/6/7/8), LUT4=LUT4-to-1. FIG. 2(b) illustrates a LUT with a recursive implementation of a NI-to-1 using NI input bits and one output bit. The hardware complexity grows exponentially as NI increases, and thus there is a point at which a NI-to-1 LUT becomes unfeasible. FIG. 2(c) illustrates how a LUT NI-to-NO is built based on 'NO' LUTs NI-to-1. Each LUT NI-to-1 implements a column of the LUT NI-to-NO. FIG. 2(d) illustrates the core of the pixel processor architecture consisting of a collection of 'NC' NI-to-NO LUTs.

Depending on the application, the LUT contents of each core can be identical or different. In addition, there might be applications in which NI and NO need to be different for each single-pixel processor core. However, for the vast majority of applications, NI and NO remain constant for all the cores.

The pixel processor core parameters may be modified at run-time via DPR allowing for the dynamic allocation of resources as needed by particular applications. For the pixel processor, DPR allows the modification of the single-pixel function by re-using the same resources. To reduce resources, DPR facilitates the reduction in the number of input and/or output bits at the expense of degraded accuracy. DPR may be used to increase the number of cores which, in turn, increases performance. In addition, the frequency of operation may be dynamically modified by controlling the DCM. The DCM feature provides the ability to directly control power and performance. The combination of DPR and dynamic frequency control allows switching between different realizations.

Figure 3:
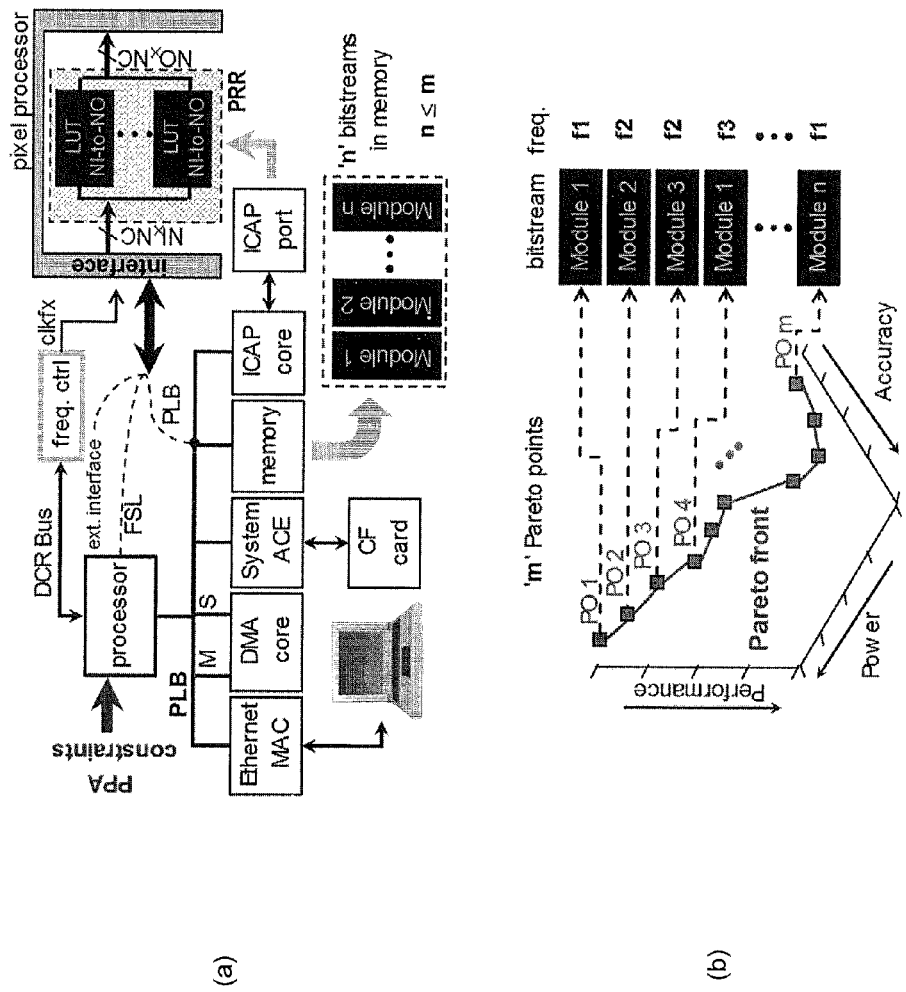
FIG. 3 illustrates a block diagram of an embedded system enabling DPR along with an exemplary embodiment of a Pareto front according to one embodiment of the invention.

DPR allows the control of NC (number of cores), NI (number of input bits), NO (number of output bits), and the LUT contents. FIG. 3 illustrates a block diagram of an embedded system enabling DPR along with an exemplary embodiment of a Pareto front. Specifically, FIG. 3($a$) illustrates an embedded system that supports DPR and frequency control. The memory holds 'n' unique bitstreams that are needed for the Pareto front with 'm' Pareto points. FIG. 3($b$) illustrates a Pareto front with 'm' Pareto points (as shown m<n). A Pareto point is a unique combination of a bitstream and frequency.

The processor can be hard-core (PowerPC) or soft-core (e.g., MicroBlaze, ARM) and be connected to any interface. A compact flash (CF) stores partial bitstreams and input frames. The memory stores data needed at run-time (e.g. input video frames, processed video frames, and partial bitstreams). For fast data processing, a direct memory access (DMA) controller may be used. The Ethernet core allows retrieval of new partial bitstreams or video frames from a processor and to send processed video frames to the processor. It is also an interface for throughput measurements and system status. The Ethernet connection lets us perform DPR from the processor (and possibly a remote location).

To perform DPR, the partial reconfiguration region (PRR) is defined. In this case, the PRR is composed of 'NC' NI-to-NO LUTs and it is dynamically reconfigured via the internal configuration access port (ICAP), which is driven by the ICAP controller. The pixel processor I/O interface depends on the application (e.g., PLB interface, FSL interface, external, etc.). The frequency control core, connected to the processor via the device control register (DCR) bus, provides a clock to the pixel processor.

DCMs inside FPGAs provide a wide range of clock management features. The dynamic reconfiguration port (DRP) of the DCM is used to dynamically adjust the frequency without reloading a new bitstream to the FPGA. The DRP uses register based control of the DCM frequency and phase.

The optimization framework for the pixel processor selects optimal realizations based on PPA constraints. The optimization is carried out for a specific single-pixel function.

First, the set of single-pixel processors is generated. The space of pixel processor realizations is generated by modifying the pixel processor parameters (NI, NO, and NC), and the frequency of operation. The LUT contents depend on NI and NO. The selection of the parameters and/or frequency combinations depends on the application. The PPA space consists of the measurements for every single pixel processor realization. The generation of the PPA space is a lengthy process, and it is done offline.

Performance can then be measured as the number of pixels (or bytes) processed per second, or by frames per second. The bytes per second processed is determined by the pixel size. Input pixels are usually 8-bit wide.

Optimal pixel processor realizations are selected based on the power, performance, and accuracy measurements. A pixel processor realization is defined to be optimal in the Pareto (multi-objective) sense if there can be no improvement on the power, performance, and accuracy measurements without decreasing on at least one of them.

As an example, with a goal to minimize power, maximize performance, and maximize accuracy, a subset of realizations is found whose results cannot be improved by any other realization for all three PPA measurements. The collection of all Pareto-optimal points forms a Pareto front—plotting realizations as points against power, and the negatives of performance and accuracy.

In embodiments that satisfy multi-objective constraints, optimal realizations are selected among the Pareto-optimal points that also satisfy the constraints. Dynamic constraint satisfaction only requires selection of Pareto optimal points when the constraints change.

In hardware, Pareto-optimal realizations are represented by their associated partial bitstreams, frequency of operation, and PPA measurements. The realizations and associated parameters are stored in memory. Dynamic PPA management is based on selecting a single realization that satisfies the dynamic constraints. When only PPA constraint is given, there can be more than one solution. Thus, it makes sense to consider minimizing one objective while imposing constraints on the other two.

In certain embedded systems, the pixel processor parameters and the frequency of operation can be modified. Thus, each realization is represented in terms of its unique combination of partial bitstream and frequency of operation. Also, the Pareto-optimal front can contain bitstreams that are associated with more than one frequency.

DPPA management allows for optimized solutions based on time-varying constraints. Pareto-optimal implementations are selected that satisfy the constraints and are implemented using DPR and dynamic frequency control.

DPR allows hardware resources to be adapted in order to meet time-varying requirements in power, resources or performance. In certain embodiments of the invention, DPR systems allow for efficient implementations of 1D FIR filters on modern FPGA devices. To minimize the required partial reconfiguration region (PRR), the implementations are based on distributed arithmetic. For a smaller required PRR, the filter coefficient values are changed while keeping the rest of the architecture fixed. However, full FIR-filter reconfigurations are possible while requiring a larger PRR.

For reconfigurable hardware, the most efficient implementations are based on distributed arithmetic (DA). These filters have coefficients fixed or hardwired within the filter's logic. This approach allows fast and efficient implementations while sacrificing some flexibility since coefficients cannot be changed at run time. DPR can be used in this scenario to provide the flexibility of coefficients' values changes without having to turn off the device and only re-writing a section of the configuration memory. The efficiency of DPR over the full reconfiguration alternative and the savings in terms of power and resources is a function of the relative size of the portion being reconfigured.

According to the invention, the DPR approach allows changes to the filter's structural configuration and/or the number of taps proving a level of flexibility that cannot be efficiently accomplished with traditional static implementations. In particular, a dynamically reconfigurable DA-based FIR system is developed that uses DPR to adapt the number and value of the coefficients, the filter's symmetry and output truncation scheme. Again, the invention allows changes to the coefficients values in certain embodiments (dynamically reconfiguring the entire FIR filter) or allows changes to the number and value of the coefficients, the symmetry, and the output truncation scheme (dynamically reconfiguring the LUTs that store the coefficients, with a small dynamic reconfiguration area).

Figure 4A:
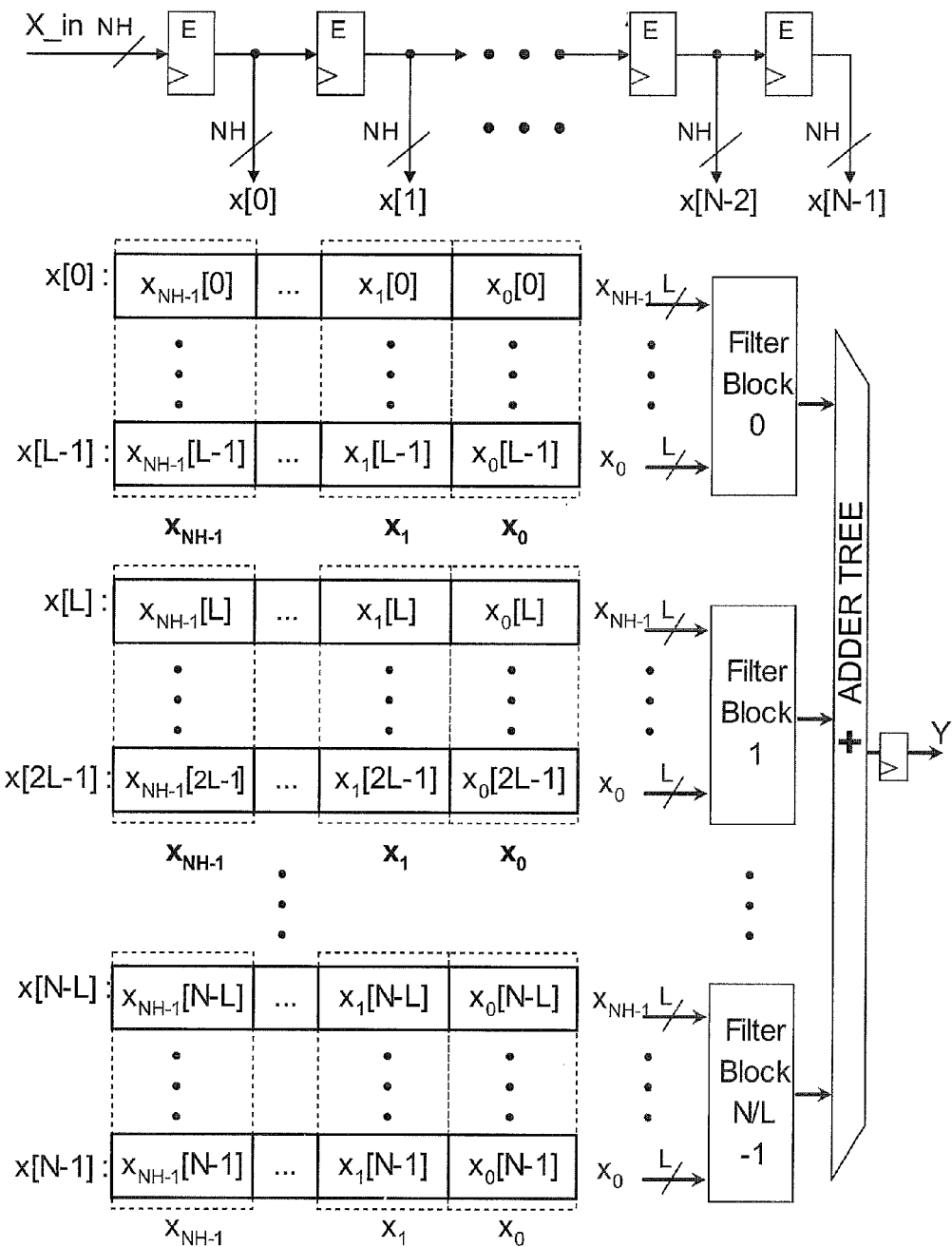
FIG. 4A illustrates one filter implementation according to certain embodiments of the invention.
Figure 4B:
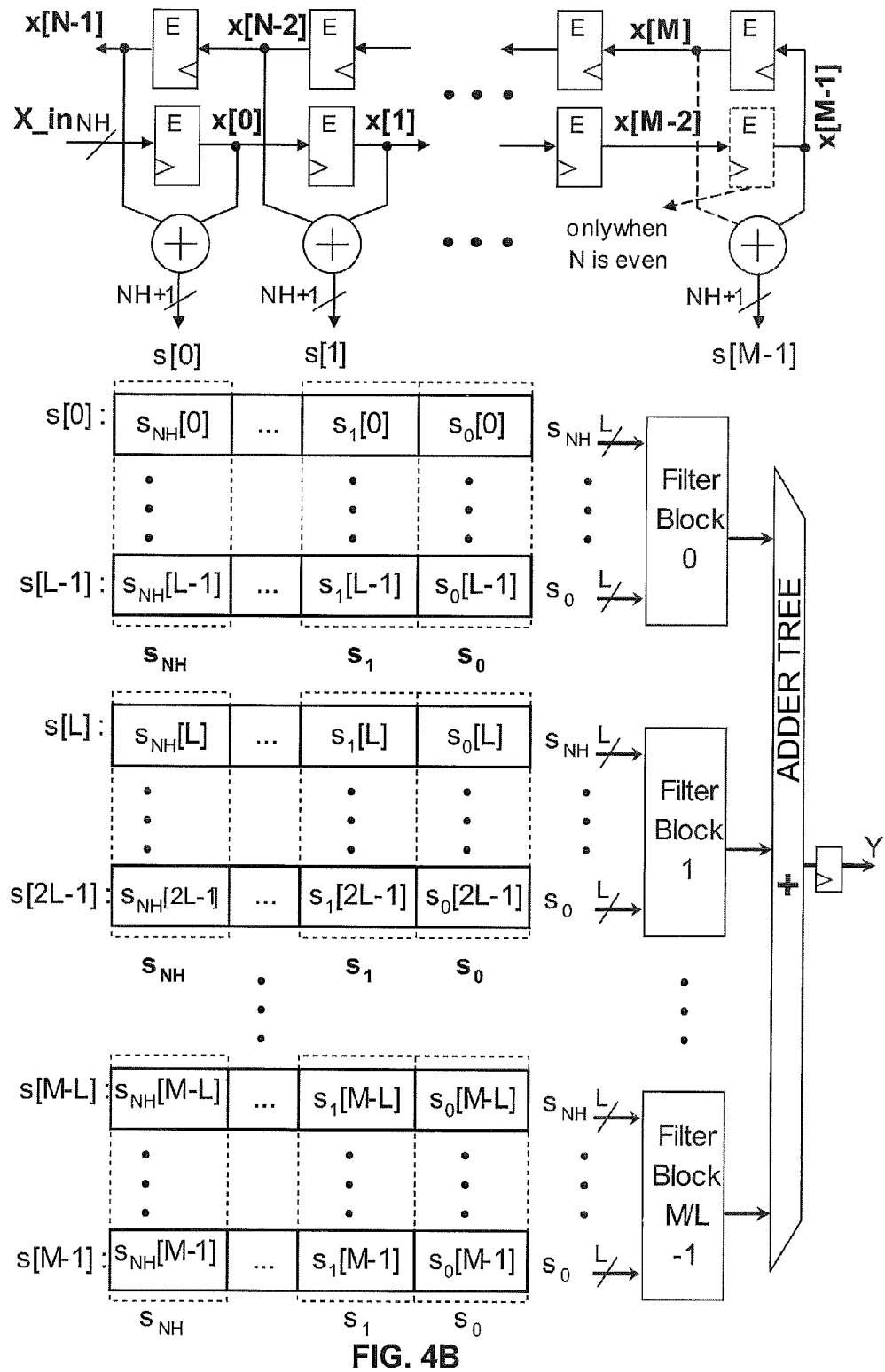
FIG. 4B illustrates another filter implementation according to certain embodiments of the invention.

FIG. 4A and FIG. 4B illustrate additional embodiments of filter implementations according to the invention. Specifically, a non-symmetric filter is shown in FIG. 4A and a symmetric filter is shown in FIG. 4B. The number of taps is denoted by N, NH represents the input/coefficients bit-width, L is the LUT input size. OP is used for controlling the output truncation scheme: (1) LSB Truncation then Saturation, (2) LSB and MSB Truncation, and (3) no Truncation. The parameter format [NO NQ] is used to denote the fixed-point output format for NO bits with NQ fractional bits. The filter coefficients are specified in an input text file. The distributed arithmetic technique rearranges the input sequence samples (be it x[n] or s[n]) into vectors of length M, which require an array of M-input LUTs. When M is large, the filter is divided into filter blocks for efficient implementation. Each filter block works on L coefficients requiring L-input LUTs (each vector of size L goes to one L-input LUT. An advantage of using FIR filter blocks is that it allows for efficient routing while mapping the implementation to the specific LUT primitives found in an FPGA. Furthermore, the approach is scalable in that can be easily ported to different LUT sizes.

Figure 5:
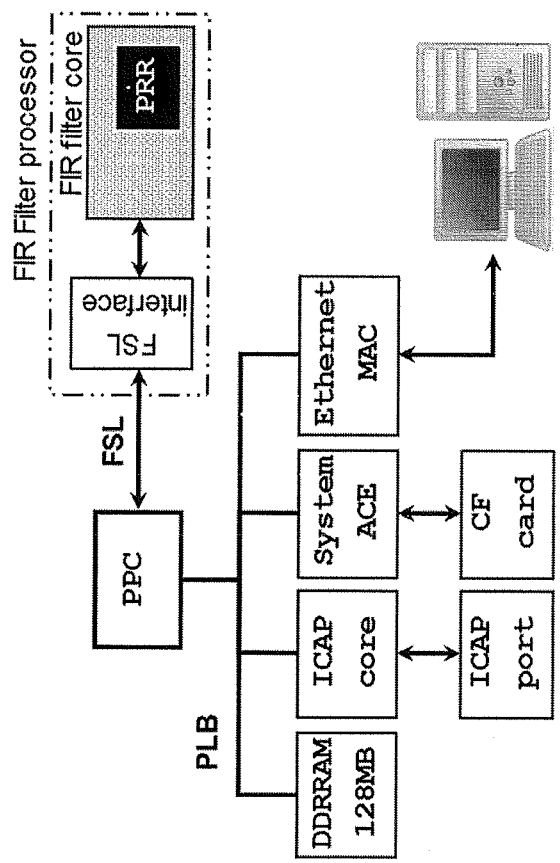
FIG. 5 illustrates a block diagram of an embedded system including a FIR filter processor according to one embodiment of the invention.

The basic FIR filter core is extended to allow for the dynamic reconfiguration of both the number and the filter coefficients themselves in an embedded system. The basic system is shown in FIG. 5. By means of DPR, a constant coefficient FIR filter is turned into an adaptive FIR filter. The PRR is pre-specified and the following dynamically reconfigurable realizations are considered: (1) coefficient-only reconfiguration in which PRR allows modifications to the filter coefficient values, while keeping the rest of the architecture intact, and (2) full filter reconfiguration in which PRR allows modification to the number of coefficients, the coefficient values, and the filter symmetry.

First, the system architecture and FIR filter dataflow, which are not affected by the PRR definition, is described. Then, each of the dynamic realizations is explained by providing a detailing representation of the PRR in the context of the FIR filter architecture.

From FIG. 5, it can be seen that the dynamic FIR core and the PowerPC (PPC) communicate using the high speed FSL Bus. The PRR is dynamically reconfigured via the internal configuration access port (ICAP), driven by the ICAP controller core. The DDR RAM stores volatile data needed at run-time, e.g.: input streams, processed streams and partial bitstreams. At power-up, SystemACE reads a compact flash (CF) Card that stores the partial bitstreams and input streams. The processed streams are written back to the DDR RAM. The Ethernet core provides reliable communication with a PC, and allows new partial bitstreams or new input streams, and to send processed streams to the PC for its verification or storage. Also, it serves as an interface for throughput measurements and system status.

The FIR filter processor, as shown in FIG. 5, consists of the FIR filter core and a control unit that provides interfacing with a bus such as a fast simplex link (FSL) bus. Different possible modes of operation are contemplated, including for example, a basic output mode, a symmetric output mode, and a streaming mode.

Figure 6:
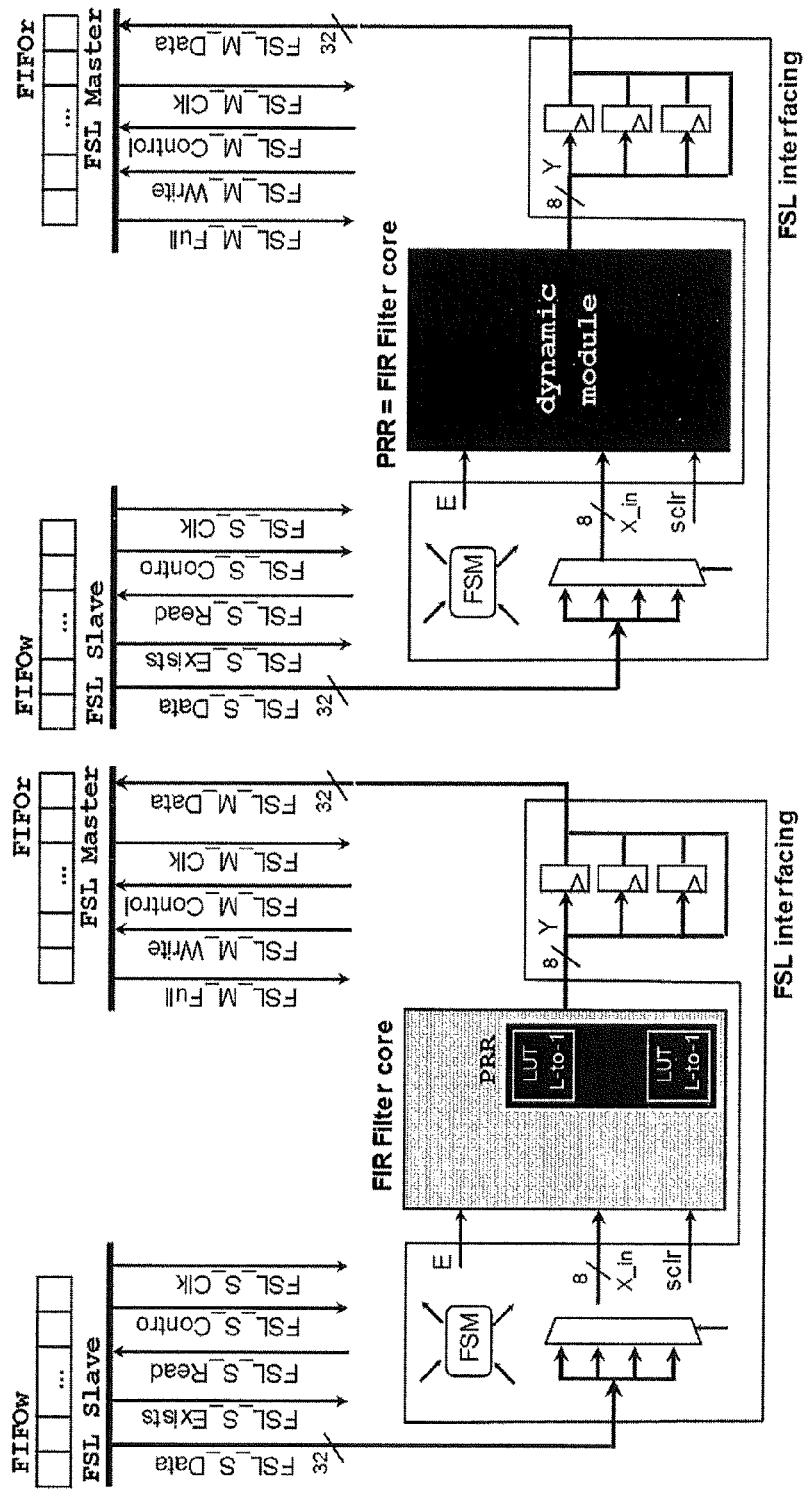
FIG. 6 illustrates FIR filter processor data flow according to one embodiment of the invention.

FIG. 6 illustrates FIR filter processor data flow according to one embodiment of the invention. The FIR filter processor receives and sends bits at a time via the bus. As an example, a bus with a FIFO-like nature allows the PPC processor to send a data stream to FIFOw to be grabbed by the FIR filter processor that in turn writes an output data stream on FIFOr to be retrieved by the PPC processor. Specifically, FIG. 6(a) illustrates PRR for dynamic reconfiguration of the coefficients and FIG. 6(b) illustrates PRR for dynamic reconfiguration of the number of coefficients, their values and symmetry.

Bus usage can be optimized by letting the PPC write a large block of data on FIFOw. The FIR filter processor then processes the data and writes the results on FIFOr in a pipelined fashion. After reading all data in FIFOr, the PPC writes another large block of data on FIFOw, i.e. the PowerPC is busy only when reading/writing each large block of data. In addition, the FIR filter processor starts reading the next available block of data on FIFOw right after writing a processed chunk of data on FIFOr. Each FIFO depth is set, for example, 64 words (32-bit words).

The static region is defined by everything else outside the PRR, including interface, circuitry, peripheral controllers, and the FIR filter core static portion (coefficient-only reconfiguration). As shown in FIG. 6, all signals between the dynamic region (PRR) and the static part are connected by pre-routed Bus Macros in order to lock the wiring. Also, the PRR I/Os are registered. To perform DPR, the partial bitstreams are read from a CF card and stored in DDR RAM. When needed, they are written to the ICAP port. For throughput measurement purposes, the partial bitstreams and the input set of streams reside on DDR RAM. The streams are sent to the FIR filter processor, and the output streams are written back to the DDR RAM. This process is repeated with different partial reconfiguration bitstreams loaded at specific rates, so as to get different filter responses and measure performance as the reconfiguration rate varies.

Coefficient-only reconfiguration is very useful for applications that only require filter coefficients modification, and it exhibits a smaller reconfiguration time overhead than the full reconfiguration case. Also, since only the LUT values are modified, the routing inside the PRR does not change. This has advantages in the area of run-time bitstream generation, as there is no need for run-time place-and-route operation.

With full filter reconfiguration, the PRR involves the entire FIR filter core. It enables the dynamic modification of the coefficients, number of coefficients, symmetry, and LUT input size.

The dynamic performance of the full filter reconfiguration case is slightly lower than the coefficient-only reconfiguration. This is due to differences in the PRR size. Dynamic performance heavily depends on reconfiguration speed and input stream size. Dynamic partial reconfiguration systems that allow a wide range of 1D FIR filters to be implemented. Requiring a significant smaller partial reconfiguration region, the first system allows changes to the FIR filter coefficients while keeping the rest of the architecture intact. Using a larger partial reconfiguration region, the second system allows full filter reconfiguration. This system can be used to switch between FIR filters based on power, performance, and resources considerations. For both systems, the required partial reconfiguration region is kept small by using distributed arithmetic implementations. Faster hardware controllers can lead to much higher throughputs for the same number of reconfigurations per second. Alternatively, much higher throughputs can be maintained at much lower reconfiguration rates.

According to the invention, the DPR systems can be extended to separate implementations of 2D dynamically reconfigurable filter banks. A dynamically reconfigurable implementation of a 2D FIR filter allows the number of coefficients and coefficients values to be varied to control energy, performance, and precision requirements. In summary, results using a standard example of 2D Difference of Gaussians (DoG) filter indicate that the DPR implementation can deliver real-time performance with energy per frame consumption that is an order of magnitude less than the Graphics Processing Unit (GPU). On the other hand, at significantly higher energy consumption levels, the GPU implementation can deliver very high performance.

Hardware implementations of digital video processing methods are of great interest because of the ubiquitous applications. In terms of performance acceleration, many image and video processing algorithms require efficient implementation of 2D FIR filters. As mentioned previously, dynamic partial reconfiguration (DPR) allows FPGA designers to explore different implementations based on energy, performance, and accuracy requirements. In addition to DPR, efficient filter implementations are based on the direct use of LUTs, the distributed arithmetic technique, and separable designs.

On the other hand, graphic processing units (GPUs) offer high-performance floating point capabilities at significant energy consumption levels. With the introduction of OpenCL and compute unified device architecture (CUDA), there has been a significant growth of GPU implementations.

Figure 7:
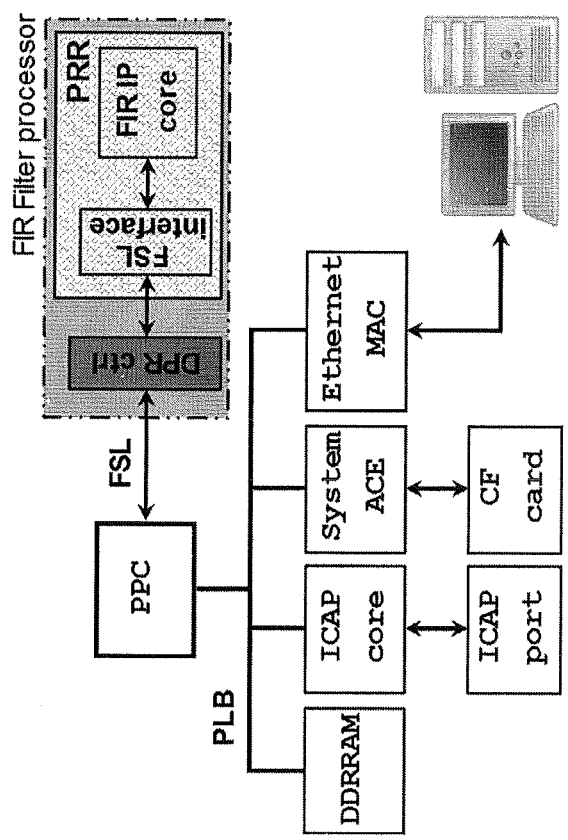
FIG. 7 illustrates a block diagram of the embedded system including 2D separable filter according to one embodiment of the invention.

FIG. 7 depicts the block diagram of the embedded system including 2D separable filter. The ID FIR filter processor core and the PowerPC (PPC) interact via the fast simplex link (FSL) bus. The PRR is reconfigured via the internal configuration access port (ICAP). The compact flash (CF) card holds the partial bitstreams and input data. Bus macros are no longer needed.

Figure 8:
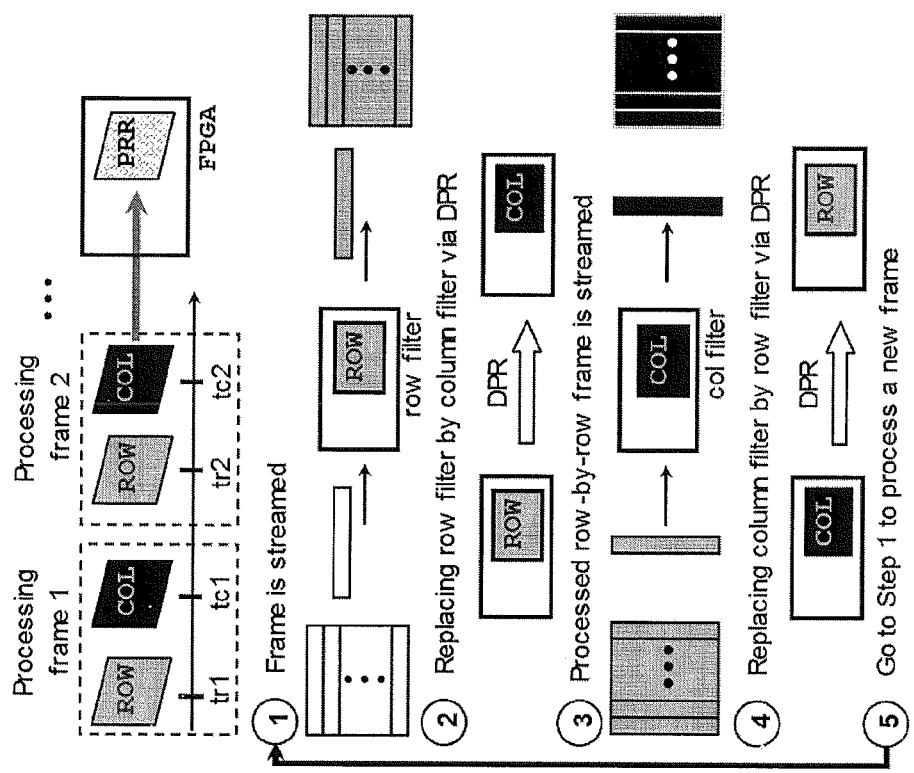
FIG. 8 illustrates a 2D separable FIR filter implementation according to one embodiment of the invention.

In the context of the embedded system of FIG. 7, a 2D separable filter is realized by i) filtering the rows, ii) turning a row filter into a column filter via DPR, and iii) filtering the columns. FIG. 8 illustrates this scheme, where the 2D filter can be modified at run-time by using a different pair of row and column filters. The filtered images (row and column-wise) are stored in the DDRRAM. The row-wise filtered image is transposed in the memory before it is streamed to the column filter.

Full-reconfiguration is allowed, i.e. the entire filter is included in the PRR. However, several modifications are introduced. First, a new parameter 'B' allows the specification of the input data bit-width (which is different from the coefficients' bit-width). Second, the frame size determines the input length of both the row and column filter—the input length is a parameter to the finite state machine (FSM) that controls the FSL interface. As a result, the FSL interface has to be included in the PRR (see FIG. 7). Third, an interface that disables the PRR outputs during reconfiguration is required since the PRR outputs now include FSL interface signals (shown in FIG. 7). In one embodiment, the 2D filter requires 2 bitstreams: one for the row filter and one for the column filter. The PRR must accommodate the largest filter.

The filter is implemented on a GPU with parallelism achieved by a grid that consists of blocks, with each block having a number of threads. All threads within a block are run in parallel from the software perspective. The actual number of blocks that can run in parallel is bounded by the number of streaming multiprocessors (SMs). A single block can be run on each SM. Also, the number of threads that can be run in parallel at each SM is given by the number of cores inside each SM. Here, GPU memory is divided into global memory, shared memory, constant memory, and texture memory.

The algorithm exposes and exploits parallelism of the 2D FIR filter in order to obtain significant speed up gains. According to the first step of the algorithm, the image and the filter kernel are transferred from the host to the device (global memory). Next, the image is divided into blocks with each image block filtered by a thread block by rows. Then the row-filtered image is also divided into blocks with each image block being column-filtered by a thread block. Lastly, the final filtered image is transferred to the host.

To more specifically describe the algorithm, the input image is of size HxW (H rows by W columns) and a filter kernel is of size KxK (row and column filter of same length). Performance is achieved based on: i) loop unrolling, ii) storing image blocks in shared memory, and iii) storing the filtering coefficients in constant memory.

Each image block is processed by first loading it to the shared memory. Then, for row filtering, each thread inside a block performs a point-wise multiplication between the row kernel and a row portion of the image. Each product is added to produce an output pixel. This process continues until the filtered image block is obtained.

Since all thread blocks work concurrently (from the software perspective), the row-filtering image remains in the global memory at the end of the previous process. This image (in blocks) is loaded again in shared memory, this time to perform column filtering. A thread block does not transpose the column-ordered data since the image block is small and it is not worth the effort. Thus, this division of the image in blocks effectively avoids transposing the entire image prior to column filtering.

For row processing, the dimension of the thread block in the x direction must be higher or equal than the effective size of the kernel. For the dimension in y direction, any power of 2 is suitable as long as H is its multiple. For column processing, the dimension of the thread block in the y direction must be higher or equal than the effective size of the kernel. For the dimension in x direction, any power of 2 is suitable as long as W is its multiple.

As one example of the FPGA implementation, the bit-width of the coefficients is set at 16 bits. The row filter receives 8-bit pixels at the input and outputs 16-bit pixels. The column filter receives and outputs 16-bits pixels, taking advantage of the symmetry of the filter. The system switches to a different 2D filter via DPR. This is realized by reconfiguring a different row filter at step 4 in FIG. 8. Then, having streamed the image through the new row filter, the respective column filter is loaded at step 2. After that, switching occurs between these new row and column filters. As a result, the PRR size is that of largest column filter. In the case of the GPU implementation, the system is implemented with double floating point numerical precision, although it can be programmed with fixed-point.

In the case of the FPGA implementation, the processing time per frame includes: i) row filtering process, ii) column filtering process, iii) transposing row-filtered image, and iv) PRR reconfiguration (twice). In the case of the GPU implementation, the processing time per frame includes: i) allocation of memory and data transfer from host to device, ii) frame processing, and iii) data transfer from device to host. Each filter variation amounts to a difference in resource usage, and in turn in different power consumption. However, the filter core is small compared to the rest of the embedded system, so the power difference is not noticeable.

The number of coefficients plays a negligible role in the processing time because the FIR filter is a fully pipelined system in which the number of coefficients only increments the register levels, which in turn increases the initial latency of the pipeline (that fades out for an input length larger than the number of coefficients). This effect is usually masked by the bus speed with bus cycles larger than the register levels of the pipeline. System performance is limited by the time spent in transposing the image and the reconfiguration time.

In the case of the FPGA, the power consumption is not dependent upon the frame size. The embedded system's power fluctuations due to the number of coefficients are negligible since only the filter core is modified. It is then more meaningful to consider the power of the FIR filter core which does vary according to N (number of coefficients). Variations for different number of coefficients are negligible since the algorithm uses the maximum number of cores regardless of the number of coefficients of the filter. The power fluctuations for different frame sizes are due to the fact that for smaller frame sizes, the GPU is moving data over a longer period of time than when it is processing.

An energy dependence on the number of coefficients exists in the FPGA case, although it is more pronounced in the GPU case. In addition, the performance dependence on the number of coefficients is negligible in the FPGA case, but noticeable in the GPU case. In terms of PSNR (dB), the GPU gives better results due to its use of double precision. In terms of performance, the GPU prevails due to the massive amount of parallelization achieved in the algorithm coupled with the high operating frequencies. In terms of energy per frame, the FPGA implementation is much better than the GPU. The FPGA implementation provides a low-energy solution at near real-time performance. On the other hand, when energy consumption is not an issue, the GPU implementation is superior, delivering much higher performance at slightly better accuracy.

Both FPGA and GPU implementations allow the user to modify the 2D FIR filter at run-time. The results indicate that separable 2D FIR filtering implementations can deliver excellent accuracy for both the FPGAs and the GPUs. However, based on energy consumption, FPGAs are preferred for low-energy applications. On the other hand, GPUs should be considered for high-performance, high-power (high-energy) applications.

Now the dynamic energy-performance-accuracy management for the 2D separable FIR filter is discussed. Digital video architectures need to meet specific, real-time constraints of performance and accuracy. For digital video processing on mobile devices, it is also important to reduce the required power and energy. For each architecture, there are definite trade-offs among energy, performance, and accuracy. Yet, it is important to recognize that EPA requirements can change. For example, for a mobile device that is running out of battery, it is important to switch to a low-power mode. On the other hand, when there is a heightened interest in specific sections of a video sequence, achieving performance and accuracy at the expense of power consumption is desired. More generally, there is interest in dynamically reconfigurable video processing architectures that can meet real-time EPA constraints, where the constraints are automatically generated by the system.

According to the invention, a dynamically reconfigurable architecture system is based on DPR technology that allows management of hardware resources in real-time. A 2D FIR filtering framework is provided for determining Pareto-optimal realizations in the EPA space. Specifically, dynamic EPA management is demonstrated on a standard video sequence.

To meet the EPA constraints, a set of Pareto-optimal realizations is generated, described by their EPA values and associated 2D FIR hardware description bitstreams. Dynamic management is achieved by selecting Pareto-optimal realizations that meet the time-varying constraints. For efficient implementation, the Pareto-optimal realizations are stored in DDR-SDRAM. The dynamic EPA management is demonstrated using a difference of gaussians (DoG) applied to a standard video sequence.

A dynamically reconfigurable 2D FIR filtering system for digital video processing applications is applicable to a large number of possible applications including, for example, image and video denoising, linear image and video enhancement, image restoration, edge detection, face recognition, etc. Different EPA requirements can be used depending on the application. Furthermore, real-time constraints can be imposed during the execution of a particular application.

As an example, a 2D FIR filtering system can be used in a real-time video analysis application. First, suppose that during real-time video acquisition that there is nothing interesting in the scene. In such a case, it may be desired to save energy until something interesting occurs. In this case, accuracy and performance may be sacrificed in order to allow longer operation. In this case, the 2D FIR filter will be dynamically reconfigured to minimize energy consumption. Now, suppose that the real-time video scene changes to something much more interesting. In this case, accuracy and performance will be improved while sacrificing energy.

According to the invention, the management system is used to dynamically reconfigure hardware resources to meet real-time constraints in energy, performance, and accuracy. Dynamic management is based on using dynamic partial reconfiguration to implement pre-computed realizations. Dynamic EPA management is achieved by swapping among Pareto-optimal realizations that meet or exceed real-time constraints. More specifically, Pareto-optimal realizations simultaneously minimize energy and maximize accuracy and performance. When multiple realizations meet the constraints, the one that also minimizes energy consumption is selected.

For efficient hardware realizations, separable filters are considered since they allow for efficient implementations by means of two 1D FIR filters. The proposed system relies on an efficient DPR controller. This is required since the 2D FIR filter is implemented through the use of DPR of 1D FIR filters.

Static FPGA image processing examples include, for example, MPEG buffer analyzer, JPEG decoders, JPEG2000 encoders, face detection systems, reconfigurable embedded systems for real-time vision and ultrasonic imaging, 2D Discrete wavelet transform using the residue number system, and binary morphology architectures.

In another embodiment of the invention, an architectural framework allows for the generation of different 2D FIR filter realizations based on the number of coefficients, the coefficient bit-width, and the output bit-width.

The dynamic 1D FIR filter core architecture includes two dynamic realizations: (1) coefficient-only reconfiguration and (2) full-filter reconfiguration. Focusing on the full-filter reconfiguration case, the entire filter is included in the Partial Reconfiguration Region (PRR), which allows the generation of many realizations for exploring the EPA space by allowing the modification of the parameters independently.

Figure 9:
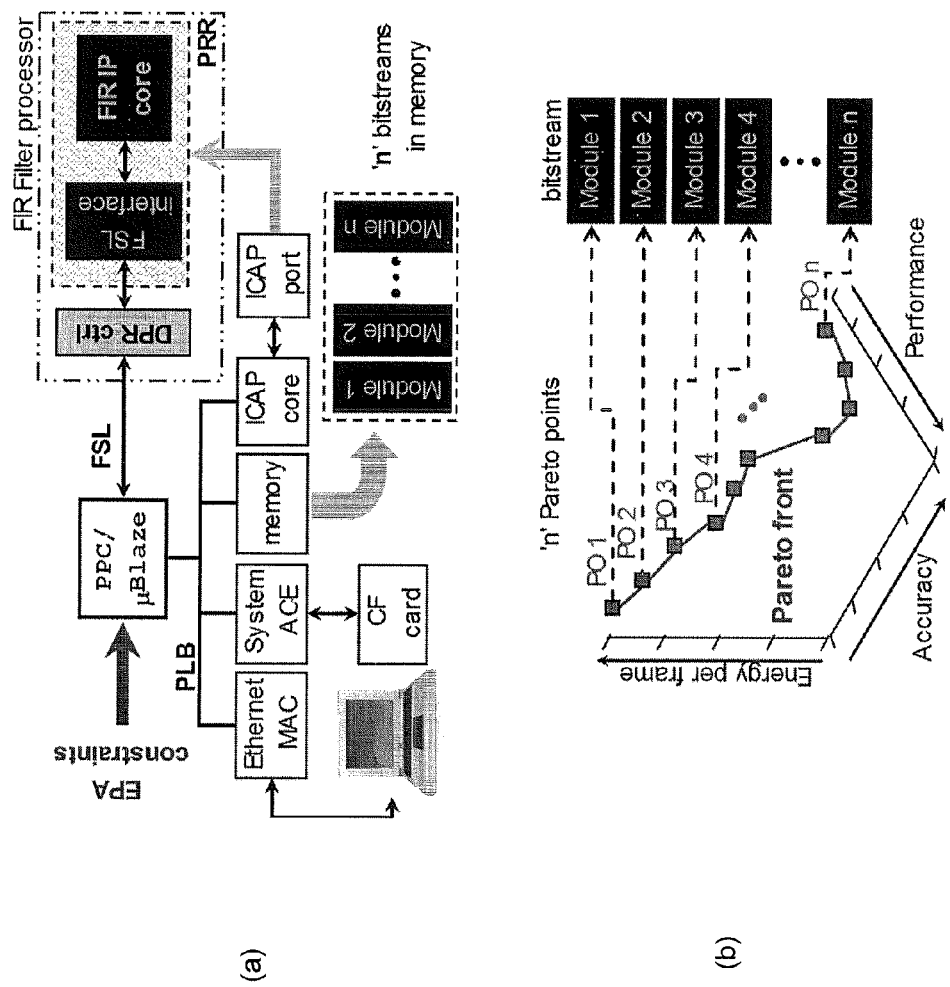
FIG. 9 illustrates a block diagram of an embedded system over which dynamic EPA management can be applied along with an exemplary embodiment of a Pareto front according to one embodiment of the invention.

FIG. 9 illustrates a block diagram of an embedded system over which dynamic EPA management can be applied along with an exemplary embodiment of a Pareto front according to one embodiment of the invention. Specifically, FIG. 9(a) shows an embedded system that allows for full-filter reconfiguration. The memory holds 'n' unique bitstreams that are needed for the Pareto front with 'n' Pareto points. FIG. 9(b) illustrates a Pareto front with 'n' Pareto points. The FIR filter processor and the processor communicate via the 32-bit Fast Simplex Link (FSL) bus. At power-up, the partial bitstreams and input data are stored in Compact Flash (CF). During run-time, the input data is stored, the DPR bitstreams of the filter realizations, and the output in the DDR-SDRAM. The Ethernet core allows new partial bitstreams or new input streams to be received from a PC and to send processed streams to the PC. It also provides an interface for throughput measurements and system status.

The static region is defined by the logic outside the PRR. The PRR I/Os are registered. The partial bitstreams are read from a CF card and stored in memory. To perform DPR, the bitstreams in memory are streamed to the ICAP port.

During DPR, changes are allowed to the I/O bit-width. This is accomplished by including the FSL interface in the PRR, which also allows the dynamic control the input stream length.

For proper DPR operation, a DPR control block is included that addresses two issues that arise due to the fact that the FSL interface is inside the PRR. First, during DPR, the PRR outputs are disabled so as to avoid erratic FSL control behavior. Second, to avoid erroneous results, the DPR control block resets the PRR flip-flops after each partial reconfiguration. This is needed since the flip-flops are not reset automatically as it is the case for full reconfiguration.

The embedded system of FIG. 9(a) includes a 2D separable FIR filter represented by 2 bitstreams (one for the row and one for the column filter). A 2D filter is implemented by cyclically swapping the row filter with the column filter via DPR.

The implementation of the 2D separable FIR filter includes several considerations. First, the 2D filtering process usually requires the output image to be of equal size as the input image. Second, the column filter is not necessarily the same as the row filter with coefficients modified. It usually requires other parameters to be modified (e.g. number of coefficients, I/O format). This requires a full filter reconfiguration. Third, the length of the input signal in the row filtering case is different than in the column case (unless the image is square). Lastly, two reconfigurations are performed per frame. The row filter processes and stores the result in a sequential row-by-row fashion, but the column filter does so in a sequential column-by-column fashion. For the purposes of this embodiment, the row-filtered output images are transposed prior to column filtering.

Figure 10:
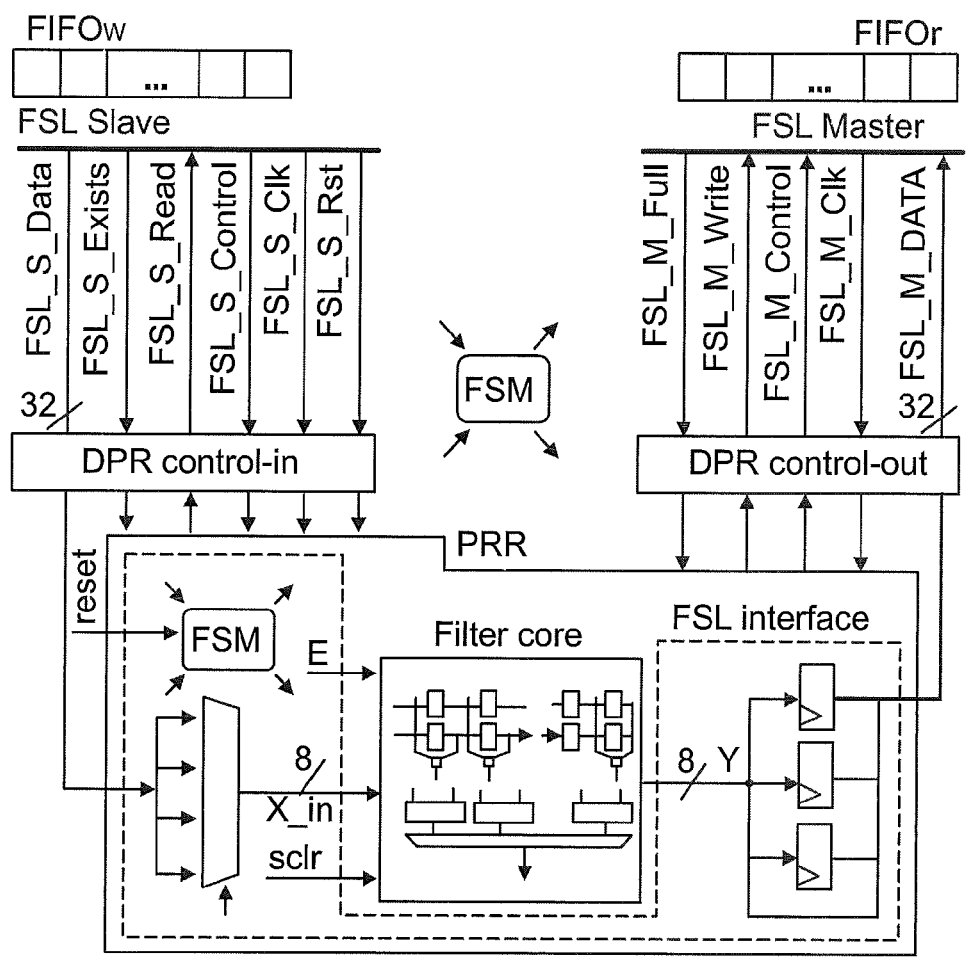
FIG. 10 illustrates the dynamic FIR filter core along with the DPR control block according to one embodiment of the invention.

FIG. 10 illustrates the dynamic FIR filter core along with the DPR control block. The FSL bus uses two FIFOs (FIFOw and FIFOr) to communicate with the FIR filter core.

The optimization framework for Video Filters facilitates extraction of an optimal set of 2D filter realizations from the EPA space. Then, a framework is provided for selecting optimal realizations that meet dynamic EPA constraints. First, a large set of filters is created from which the optimal set is extracted. Although this space is generated offline, it is contemplated that it can be generated online.

The space of possible 2D FIR filter realizations is generated by varying the parameters—the number of coefficients, the coefficient bit-width, and the output bit-width. Here, for each 2D filter, N, L, NH are assumed to stay the same for both row and column filters, while B and [NO NQ] can be different. By varying the input stream length NX, which is usually different for both the row and column filters, different frame sizes are explored. The collection of EPA measurements for each filter realization forms the "EPA space" of possibilities.

It is noted that the performance of the embedded system depends on many factors (cache size, processor instruction execution, bus usage, etc.) that can easily change. Filter performance is based on filter processing time and reconfiguration time.

The maximum reconfiguration speed is achieved if there is a direct link between the ICAP port and the memory that holds the partial bitstreams. If the DPR bitstreams are loaded in the BRAM (local memory inside the FPGA), it is possible to get the maximum reconfiguration speed. However, the size and quantity of partial bitstreams is limited by the available BRAMs.

Based on energy per frame, performance, and accuracy (EPA) measurements, the EPA space is created from which the optimal realizations are extracted. A 2D filter realization is defined to be optimal in the multi-objective (Pareto) sense if its EPA measurements cannot be improved upon without decreasing on at least one of them.

The goal is to minimize the energy per frame consumption and to maximize performance and accuracy. For a given EPA space, the collection of all Pareto optimal realizations forms a Pareto front as shown in FIG. 9(b). The points are plotted against energy, and the negatives of performance and accuracy.

Figure 11:
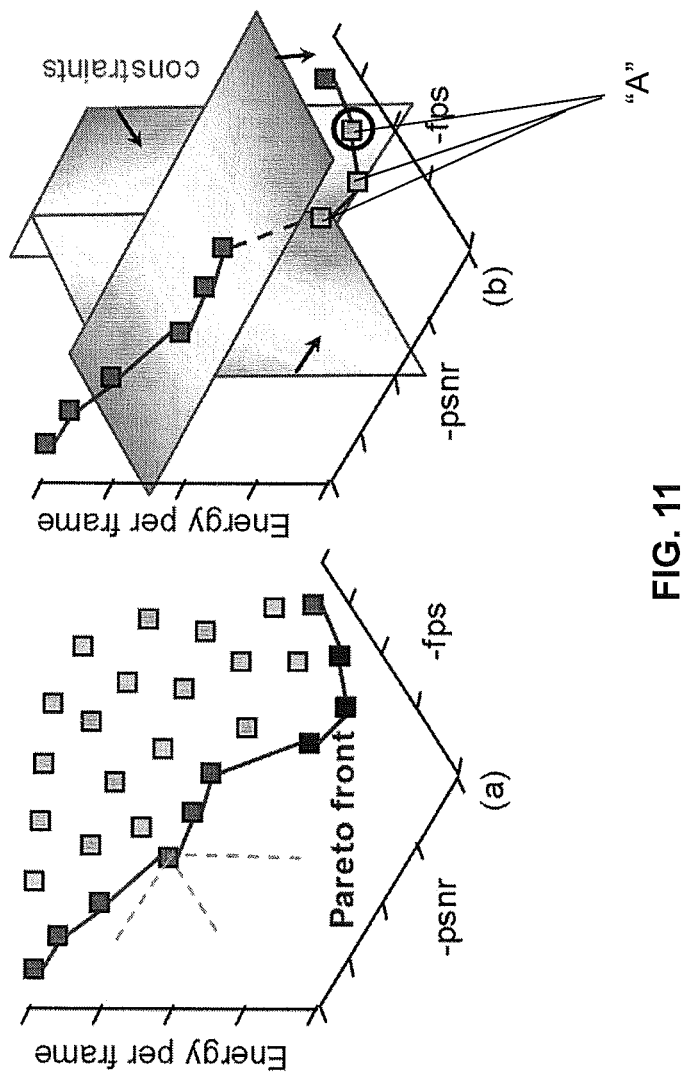
FIG. 11 illustrates multi-objective optimization of the EPA space according to one embodiment of the invention.

FIG. 11 illustrates multi-objective optimization of the EPA space according to one embodiment of the invention. Specifically FIG. 11(a) shows the EPA space along with the Pareto front. Independent constraints appear as planes in 3-D. Optimal realizations are then selected among the Pareto optimal points that also satisfy the constraints as shown by "A" in FIG. 11(b). Dynamic EPA constraints satisfaction only requires selection of Pareto-optimal points when the constraints change. The selected 2D FIR filter realization is chosen to be the one that also minimizes the energy consumption. Thus, a collection of Pareto-optimal solutions based on maximizing accuracy and performance, while minimizing consumption of energy per frame is determined.

The performance of video communication systems depends on balancing requirements associated with the network, the user experience, and the video display device. For example, the network imposes bandwidth constraints. On the other hand, users require sufficient levels of video quality. For display on mobile devices, it is also important to conserve power. Often, the constraints can lead to opposing requirements. For example, delivering higher video quality requires higher levels of power and bandwidth.

In another embodiment of the invention, a video processing system meets real-time constraints through dynamic reconfiguration. A dynamically reconfigurable framework allows the users to meet real-time constraints on image quality, dynamic power consumption, and available bandwidth. Specifically, the invention is applied to motion JPEG or MJPEG such as that used in applications including, for example, low profile webcams, surveillance systems, and emerging applications in virtual network computing (VNC). However, the invention can be applied to any video coding standard since the use of the Discrete Cosine Transform (DCT) and quantization tables is shared by all video coding standards.

Four modes are introduced that can be used to provide optimal performance subject to real-time constraints.

The first mode is directed to a minimum dynamic power mode. The goal is to minimize dynamic power subject to available bandwidth and a minimum level of acceptable image quality. In this mode, a mobile device can reduce its power requirements without sacrificing the user experience. Furthermore, in this mode, a mobile device can conserve energy and maximize its operating time.

The second mode is directed to a minimum bitrate mode. The goal is to minimize bitrate requirements subject to a maximum level of dynamic power and a minimum level of acceptable image quality. Thus, the user can enjoy the compressed video without sacrificing video quality. Furthermore, since the bitrate is minimized, the network can accommodate a large number of users without sacrificing the service.

The third mode is directed to a maximum image quality mode. The goal is to maximize image quality without exceeding the maximum available bandwidth or the maximum available dynamic power. In this mode, the user will be able to examine the video at the maximum possible video quality that can be delivered by all available bandwidth and computing power.

The fourth mode is directed to a typical mode with the goal to optimize a weighted average of the required dynamic power, bitrate, and image quality within constraints on all of them. Here, a balanced approach supports trade-offs between dynamic power, quality, and bitrate.

Figure 12:
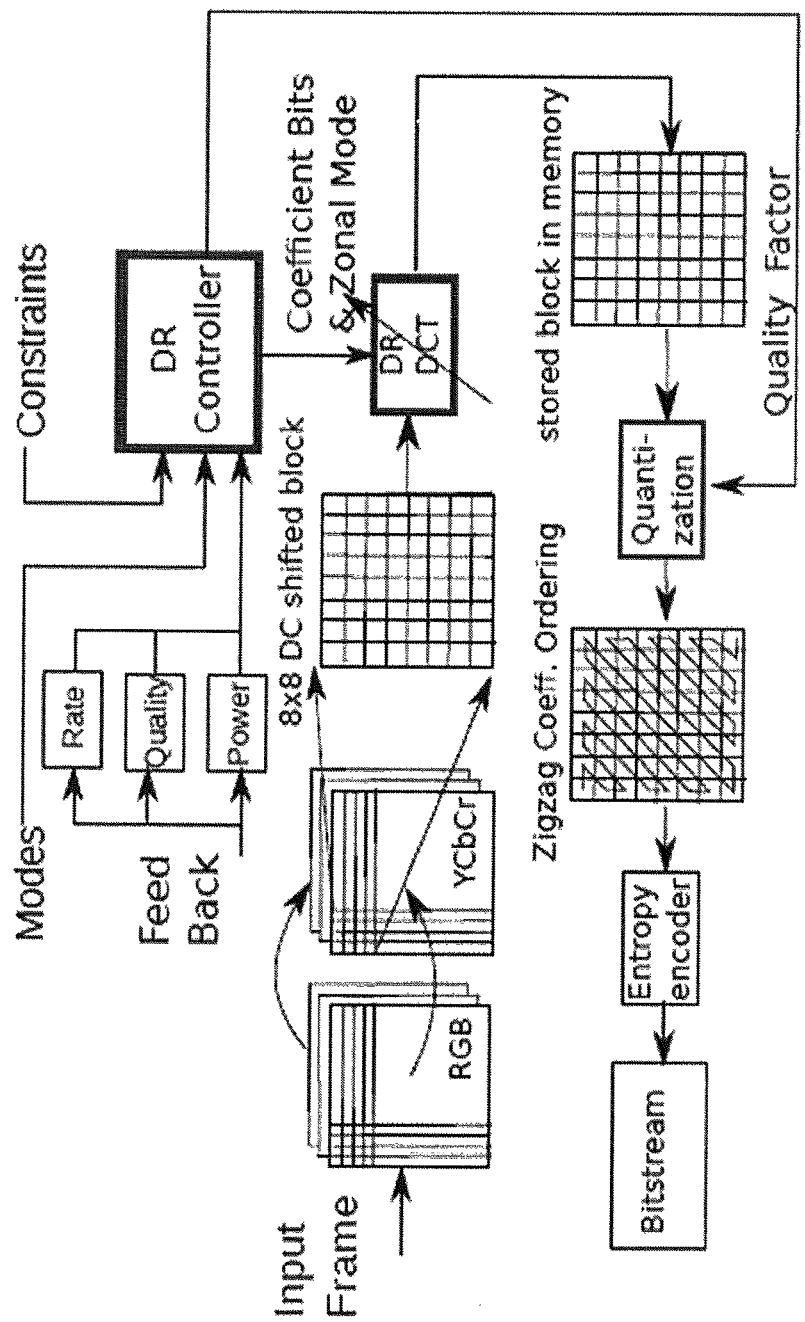
FIG. 12 illustrates a block diagram of a dynamically reconfigurable architecture system for time-varying image constraints according to one embodiment of the invention.

FIG. 12 illustrates a block diagram of a dynamically reconfigurable architecture system for time-varying image constraints according to one embodiment of the invention. For exemplary purposes, the invention is demonstrated in the compression of the Y component of color video. A joint software-hardware optimization system is considered that uses a Dynamic Reconfiguration (DR) controller to select DCT hardware cores and quality factor (QF) values to meet constraints in bitrate, image quality, and power. To solve the optimization problem, feedback of the current bitrate is relied upon, image quality is measured using the structural similarity index metric (SSIM), and precomputed dynamic-power is consumed by an adaptive DCT core. A dynamic reconfiguration (DR) controller compares the current bitrate, image quality, and power with the required levels to determine if constraints are met. Depending on each optimization mode, a suitable DCT core and quality-factor value is selected for the next video frame. Alternatively, the dynamic reconfiguration overhead can be reduced by fixing the hardware configuration over a number of video frames or until a maximum number of reconfigurations has been met.

As shown in FIG. 12, embedded system focuses on the development of a dynamically reconfigurable framework that can meet communication constraints through the use of joint software-hardware optimization that involves the Discrete Cosine Transform and the quality factor.

A constrained optimization framework for defining the modes is determined using a joint software-hardware implementation. For the minimum power mode, the dynamic power consumed by the FPGA is denoted by DP. For the minimum bitrate mode, Q denotes the image quality, which is measured using SSIM. For the maximum image quality mode, BPS denotes the number of bits per sample. In terms of the free parameters that can be modified to change objectives, HW denotes the different hardware configurations, and QF denotes the quality factor used for controlling the quantization table (software controlled). The objective functions DP, Q, BPS are functions of the hardware (HW) and the quality factor (QF).

Constraints on the objectives include a minimum acceptable image quality level denoted by Qmax and a maximum dynamic power available is denoted by $P_{max}$.

The Pareto-optimal hardware realizations are pre-computed and stored in memory. Pareto-optimal configurations are indexed by estimates of their performance over a training set of images. Starting with the mode constraints, the hardware configurations that meet the objective constraints are selected. As an example, for the typical mode, the hardware realizations are selected from the Pareto-front that satisfy: (BPS≤$B_{max}$), (SSIM≥$Q_{min}$), and (DP≤$P_{max}$).

Video communications dominate bandwidth requirements in most, real-time communications systems. Yet, constraints on real-time communications can vary based on available bandwidth, power, or the required level of image quality.

The invention is directed to a real-time hardware reconfiguration framework that can be used to select and implement jointly optimal (in the multi-objective sense) hardware realizations and associated software parameters. Beyond standard rate-distortion optimization, the invention jointly optimizes dynamic power consumption, the quality of the reconstructed image, and the required bitrate. The four modes for video communications based on (1) minimum dynamic power, (2) minimum bitrate mode, (3) maximum image quality mode, and (4) a typical mode that attempts to balance among multiple constraints.

Figure 13:
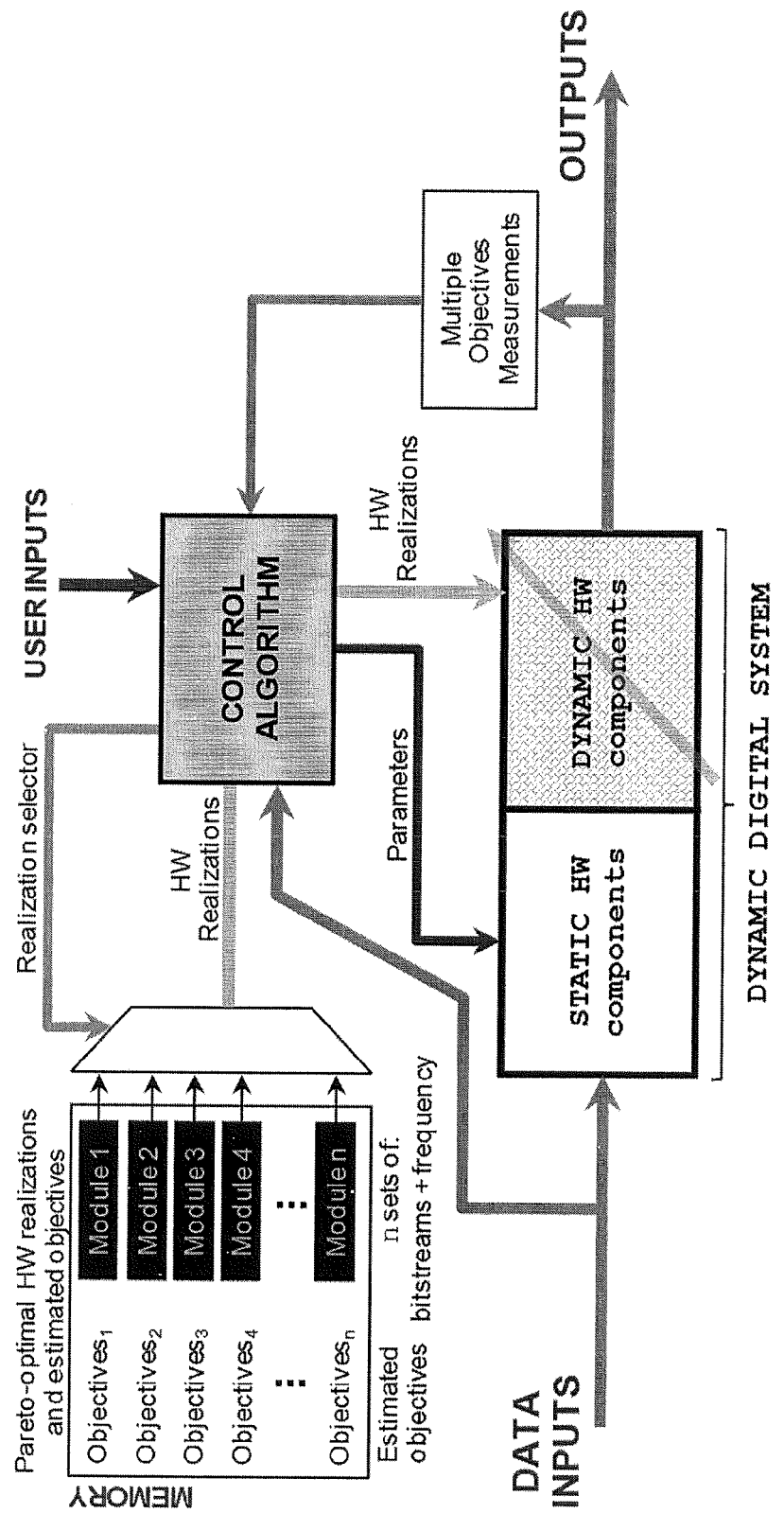
FIG. 13 illustrates a block diagram of an embedded system over which dynamic EPA management can be applied according to one embodiment of the invention.

FIG. 13 illustrates a block diagram of an embedded system over which dynamic EPA management can be applied according to one embodiment of the invention. Based on data, user inputs, and/or objective measurements, a control algorithm selects the optimal combination of hardware realization/software parameters. If the current implementation does not meet the real-time constraints as measured during operation, then, assuming that more modules are available, a new, more-conservative module may be selected for future data. In FIG. 13, user inputs and data inputs are optional. The control algorithm may be able to determine the optimal module from the objective measurements alone.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A computer system including a processor and a memory for producing a dynamically reconfigurable framework for performing a digital video processing and/or communications task comprising the steps of:

varying by the processor one or more parameters to generate a plurality of hardware configurations and software realizations, wherein each software realization comprises software parameters including associated algorithms and the hardware configuration includes one or more selected from the group consisting of: a hardware realization in a field programmable gate array (FPGA), a graphical processing unit (GPU), a combination of multiple cores and single instruction multiple data (SIMD) extensions of a central processing unit;

obtaining by the processor associated objective values for each hardware configuration and each software realization wherein the associated objective values are selected from: a power measurement, a performance measurement, a video bitrate level and an accuracy measurement;

using by the processor the associated objective values to determine the hardware configurations and software realizations of the plurality that are Pareto-optimal to obtain a collection of Pareto-optimal configurations;

storing in the memory the collection of Pareto-optimal configurations and the software parameters including associated algorithms;

providing a sequence of real-time constraint optimization problems that are specified in terms of the associated objective values, wherein the real-time constraint optimization problems are selected from the group comprising: a minimum power objective, a maximum performance objective, a maximum accuracy objective, a minimum bitrate level objective, and an objective comprising of a weighted sum of power, performance, and accuracy; and selecting in real-time an optimal combination of the software parameters and the hardware configuration that either solves each of the real-time constraint optimization problems or minimizes violations of the real-time constraint optimization problems to obtain selected optimal combinations including selected software parameters including associated algorithms, wherein the hardware configuration involving a FPGA further comprises the step of implementing in real-time each one of the selected optimal combinations by using dynamic partial reconfiguration to implement the hardware configuration in the FPGA and the selected software parameters, or by using dynamic frequency control.

2. The computer system according to claim 1, wherein the field programmable gate array is part of a pixel processor architecture.

3. The computer system according to claim 2, wherein one or more hardware parameters of the pixel processor architecture that is used for generating the collection of Pareto-optimal configurations is selected from the group comprising: a number of cores, a number of bits of the input pixels, a number of bits of the output pixels, and a frequency of operation.

4. The computer system according to claim 2, wherein each pixel of the pixel processor architecture is processed independently of any other pixel.

5. The computer system according to claim 1, wherein the field programmable gate array is part of a digital filtering architecture.

6. The computer system according to claim 5, wherein the digital filtering architecture is one-dimensional.

7. The computer system according to claim 5, wherein the digital filtering architecture is two-dimensional.

8. The computer system according to claim 5, wherein the digital filtering architecture includes video compression accomplished using the Discrete Cosine Transform (DCT) hardware core that can be parameterized using a different number of bits for representing input, output, and DCT filter coefficients and a software coefficient that consists of a Quality Factor.

9. The computer system according to claim 5, wherein one or more hardware parameters of the digital filtering architecture are selected from the group comprising: a number of coefficients, a number of bits representing the number of coefficients, and a number of bits for representing the output.

10. A computer system including a processor and a memory for producing a dynamically reconfigurable framework for performing a digital video processing and/or communications task comprising the steps of:

varying by the processor one or more parameters to select one or more hardware configurations of one or more graphical processing units (GPUs) and one or more corresponding software realizations, wherein each software realization comprises software parameters including associated algorithms;

obtaining by the processor associated objective values for the one or more hardware configurations of the one or more graphical processing units (GPUs) and the one or more corresponding software realizations, wherein the associated objective values are selected from: a power measurement, a performance measurement, a video bitrate level and an accuracy measurement;

using by the processor the associated objective values to select the one or more hardware configurations of the one or more graphical processing units (GPUs) and the one or more corresponding software realizations that are Pareto-optimal to obtain a collection of Pareto-optimal configurations;

storing in the memory the collection of Pareto-optimal configurations and the software parameters including associated algorithms;

providing a sequence of real-time constraint optimization problems that are specified in terms of the associated objective values, wherein the real-time constraint optimization problems are selected from the group comprising: a minimum power objective, a maximum performance objective, a maximum accuracy objective, a minimum bitrate level objective, and an objective comprising of a weighted sum of power, performance, and accuracy; and selecting in real-time an optimal combination of the software parameters and the one or more hardware configurations of one or more graphical processing units (GPUs) that either solve each of the real-time constraint optimization problems or minimize violations of the real-time constraint optimization problems to obtain selected optimal combinations including selected software parameters including associated algorithms.

11. The computer system according to claim 10, wherein the varying step further comprises the step of generating a hardware configuration of a central processing unit (CPU).

12. The computer system according to claim 10, wherein the central processing unit (CPU) is a multiple core CPU.

13. The computer system according to claim 10, wherein the graphical processing unit (GPU) is part of one or more selected from the group of a pixel processor architecture and a digital filtering architecture.

14. The computer system according to claim 10, wherein one or more hardware parameters used for generating the collection of Pareto-optimal configurations is selected from the group comprising: a number of cores, a number of bits of the input pixels, a number of bits of the output pixels, and a frequency of operation.

15. A computer system including a processor and a memory for producing a dynamically reconfigurable framework for performing a digital video processing and/or communications task comprising the steps of:

varying by the processor one or more parameters to select cores from a multiple core central processing unit (CPU) and one or more software realizations, wherein each software realization comprises software parameters including associated algorithms;

obtaining by the processor associated objective values for the multiple core central processing unit (CPU) hardware configuration and each software realization wherein the associated objective values are selected from: a power measurement, a performance measurement, a video bitrate level and an accuracy measurement;

using by the processor the associated objective values to determine the multiple core central processing unit (CPU) hardware configuration and the one or more software realizations that are Pareto-optimal to obtain a collection of Pareto-optimal configurations;

storing in the memory the collection of Pareto-optimal configurations and the software parameters including associated algorithms;

providing a sequence of real-time constraint optimization problems that are specified in terms of the associated objective values, wherein the real-time constraint optimization problems are selected from the group comprising: a minimum power objective, a maximum performance objective, a maximum accuracy objective, a minimum bitrate level objective, and an objective comprising of a weighted sum of power, performance, and accuracy; and selecting in real-time an optimal combination of the software parameters and the multiple core central processing unit (CPU) hardware configuration that either solves each of the real-time constraint optimization problems or minimizes violations of the real-time constraint optimization problems to obtain selected optimal combinations including selected software parameters including associated algorithms.

16. The computer system according to claim 15, wherein the varying step further comprises the step of generating a hardware configuration by selecting cores and associated memories from one or more graphical processing units (GPUs).

17. The computer system according to claim 15, wherein the multiple core central processing unit (CPU) hardware configuration implements in real-time each one of the selected optimal combinations by using dynamic partial reconfiguration to implement the multiple core central processing unit (CPU) hardware configuration and the selected software parameters, or by using dynamic frequency control.

18. The computer system according to claim 15, wherein the multiple core central processing unit (CPU) is part of one or more selected from the group of a pixel processor architecture and a digital filtering architecture.

19. The computer system according to claim 15, wherein one or more hardware parameters used for generating the collection of Pareto-optimal configurations is selected from the group comprising: a number of cores, a number of bits of the input pixels, a number of bits of the output pixels, and a frequency of operation.

* * * * *